United States Patent
Sherlock et al.

(10) Patent No.: US 8,880,760 B2
(45) Date of Patent: Nov. 4, 2014

(54) SELF ORGANIZING HEAP METHOD INCLUDES A PACKET REORDERING METHOD BASED ON PACKET PASSING RULES ONLY REORDERING PACKETS FROM A LOAD/UNLOAD INPUT SIGNAL IS ASSERTED

(75) Inventors: Derek Alan Sherlock, Boulder, CO (US); Matthew B Lovell, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 48 days.

(21) Appl. No.: 13/458,678

(22) Filed: Apr. 27, 2012

(65) Prior Publication Data

US 2013/0290573 A1  Oct. 31, 2013

(51) Int. Cl.
*G06F 13/00* (2006.01)
*G06F 3/00* (2006.01)

(52) U.S. Cl.
USPC ............ 710/39; 710/52; 370/230.1; 370/370; 370/235

(58) Field of Classification Search
USPC .............. 370/230, 235, 429, 394; 710/39, 52
See application file for complete search history.

(56) References Cited

U.S. PATENT DOCUMENTS

| | | | |
|---|---|---|---|
| 6,577,635 B2 | 6/2003 | Narayana et al. | |
| 6,606,710 B2 * | 8/2003 | Krishnan et al. | 726/13 |
| 6,862,282 B1 | 3/2005 | Oden | |
| 7,072,342 B1 | 7/2006 | Elnathan | |
| 7,243,184 B1 * | 7/2007 | Ferguson et al. | 711/100 |
| 7,626,987 B2 | 12/2009 | Williams, Jr. et al. | |
| 7,876,677 B2 * | 1/2011 | Cheshire | 370/230.1 |
| 7,957,288 B2 * | 6/2011 | Georgiou et al. | 370/235 |
| 8,059,543 B2 | 11/2011 | Ferguson et al. | |
| 8,737,403 B2 * | 5/2014 | Rahim et al. | 370/394 |

* cited by examiner

*Primary Examiner* — Tammara Peyton
(74) *Attorney, Agent, or Firm* — Preetam B. Pagar

(57) ABSTRACT

In one aspect a memory module storing a plurality of packets is provided. A self organizing heap contains elements associated with each of the packets. The self organizing heap reorders the packets based on packet passing rules. In another aspect, a plurality of elements associated with packets is provided. Each element includes a state machine. The state machine operates in accordance with packet passing rules. The state machine reorders the packets by selective swapping of adjacent elements.

12 Claims, 10 Drawing Sheets

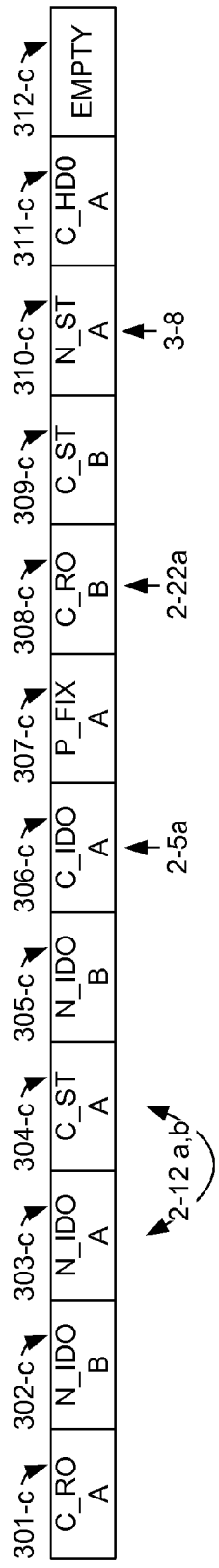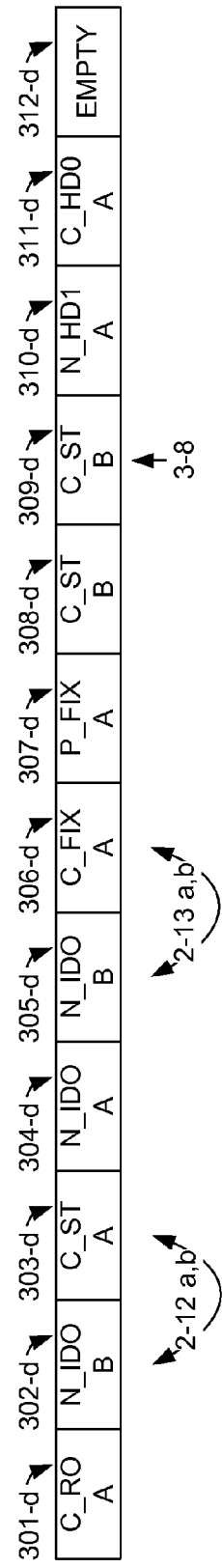
FIG. 3(c)
FIG. 3(d)

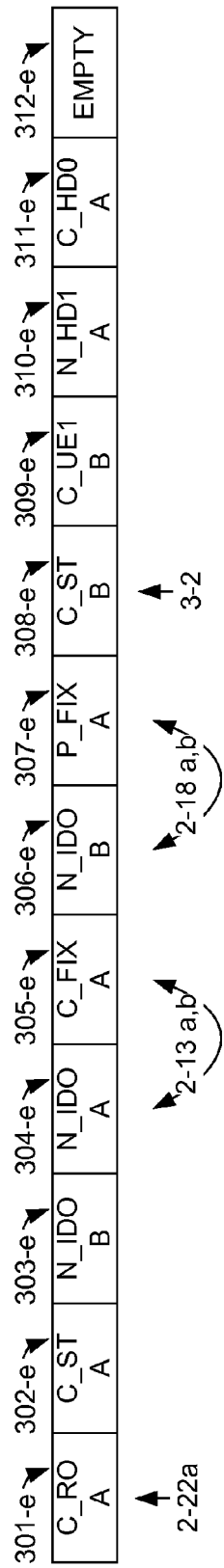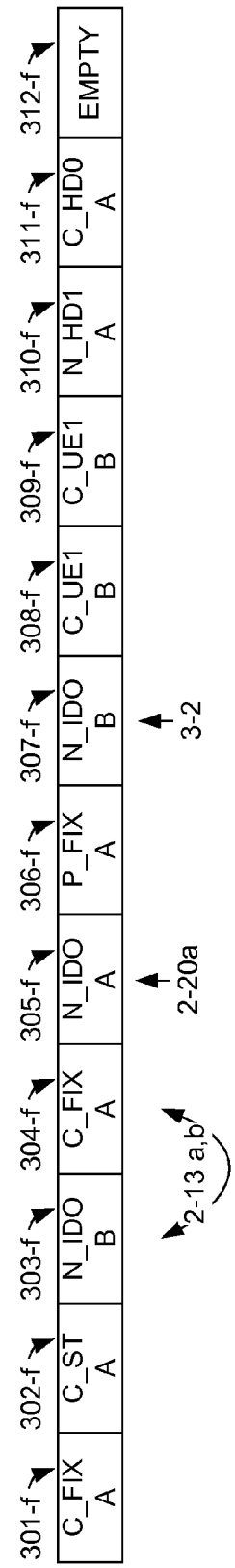
FIG. 3(e)
FIG. 3(f)

//  SELF ORGANIZING HEAP METHOD INCLUDES A PACKET REORDERING METHOD BASED ON PACKET PASSING RULES ONLY REORDERING PACKETS FROM A LOAD/UNLOAD INPUT SIGNAL IS ASSERTED

BACKGROUND

In packet-oriented communications, packets traversing a communications fabric may represent messages belong to multiple message classes (sometimes known as ordering classes, flow control classes, or virtual channels). One example of a physical communication channel bearing multiple message classes includes PCI Express, although there are many other such channels. Message classes exist if different streams of messages share a common fabric, yet have different flow control, ordering, or passing restrictions or requirements.

A single message class may have ordering constraints within itself. For example, the preservation of strict ordering or the prohibition of passing based upon some packet-specific criterion such as a conflict of their associated protocol-layer addresses. In addition to ordering constraints within a message class, there may be ordering restrictions and passing restrictions or independence requirements between message classes.

Passing restrictions or independence requirements within or between message classes may arise for various reasons. They may be required to avoid deadlock, to correctly support a data coherency or consistency model, or to allow for performance optimizations. In some cases, passing of packets in one class by those in another may be required under some circumstances for correct operation yet undesirable in general for performance.

DETAILED DESCRIPTION

Figure 1:
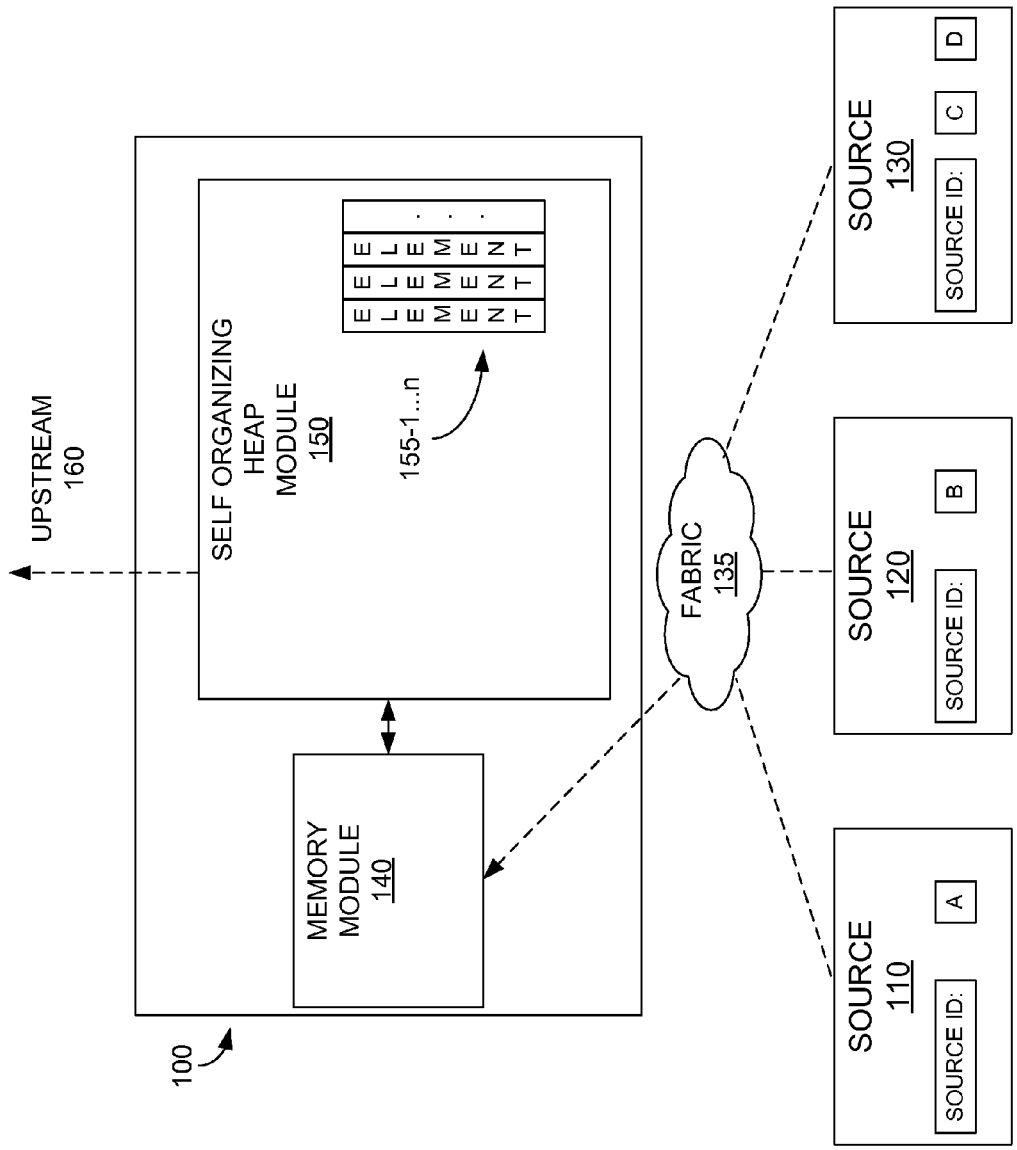
FIG. 1 depicts a high level example of a device.

To illustrate the concepts presented with respect to packet passing, consider the PCI Express (PCIe) fabric. Although the following description is based on PCI Express, it should be understood that the techniques presented herein are not limited to PCI Express and may be applicable to many fabrics containing multiple message classes. Message classes in PCI express are referred to as ordering classes. A Direct Memory Access (DMA) read request is one type of PCIe packet that is included in an ordering class referred to as a non-posted class. A DMA write request is another type of PCIe packet that is included in an ordering class referred to as a posted class. Yet a third type of PCIe packet is a completion packet that is included in an ordering class of packets referred to as a completion class.

In general, a PCIe card may send packets toward a root port. According to the PCIe specification, posted class packets, which may be referred to as posted packets, are allowed to pass non-posted class packets, which may be referred to as non-posted packets, as they travel toward the root port. The reason for this is that if a non-posted packet were to form an impassible barrier to the passage of a posted packet, a deadlock could result. PCIe uses per ordering class credit based flow control and if sufficient credits are not available to send a non-posted class packet, absent passing, all posted packets would be blocked, even if sufficient credits were available for the posted class.

However, such passing may be counterproductive to system performance. Upstream posted packets are typically large packets, fanning in from many IO cards to a single Root Port, thereby creating congestion. Because they are posted requests, long queuing delays seen by posted packets are not directly harmful to posted packet performance. But, if that queuing delay is also experienced by non-posted packets, which are trapped behind the posted packets, performance problems may result. Non-posted packets are latency sensitive and any unnecessary queuing delays are costly to performance.

Thus, both directions of posted and non-posted passing have a role to play. Posted packet passing non-posted packet is used to prevent deadlock, while non-posted packet passing posted packet is desired, and permitted under certain conditions, to improve non-posted packet performance. The conditions imposed on non-posted packets passing posted packets are embodied in an aspect of the PCIe specification called Identification Based Ordering (IDO). Completion packets are another class of packet that may benefit from the ability to pass other classes of packets. Just as above, the PCIe specification provides rules for the passing of and passing by completion packets. In addition, the PCIe specification provides an additional set of rules called Relaxed Ordering (RO) for completion packets. The rules of IDO and RO are described in further detail below.

As described above, in the PCI Express architecture there are generally three ordering classes: Posted (P), Non-Posted (N), and Completion (C). The rules for when and how a packet of one class may pass others of the same or different class have been set out in the PCI Express specification. In general, a posted packet will not pass another posted packet. The rules for a posted packet using IDO do allow for a posted packet to pass another posted packet that comes from a different source, however such passing does not provide any benefit in performance. As such, for purposes of this description, a posted packet passing another posted packet is not allowed. A posted packet may pass any non-posted or completion packet. The rules for a non-posted packet using IDO are that a non-posted packet may pass any posted packet that does not have the same source identifier as the non-posted packet. A non-posted packet that is not using IDO may not pass any posted packet, regardless of source. A non-posted packet may pass other non-posted packets, subject to the rules above. A non-posted packet may pass any completion packet, regardless of source.

The rules for completion packets are slightly more complex. If neither IDO nor RO is allowed for a completion packet, the packet is not allowed to pass any posted packet. If IDO is allowed, but RO is not allowed, then a completion packet is not allowed to pass any posted packet that contains the same source identifier as the completion packet. If RO is allowed, then a completion packet is allowed to pass any posted packet, regardless of source. Based on the IDO and RO rules, a completion packet may not pass any other completion packet, regardless of source. A completion packet may pass any non-posted packet, regardless of source.

The PCI Express specification does allow completion packets to pass each other, if they have distinct transaction ID values. This passing is described in the PCI Express specification, and is not related to RO or IDO. Passing of completions by other completions will not be described as an example herein. However, the principles described herein could also be used to implement passing between completions.

The rules described above explain when one packet may pass another packet when using IDO and RO. It should be understood that although a packet may pass another packet, the packet is not required to do so. Furthermore, there is generally no requirement for ordering of packets of different classes or within a class, other than those which result from the rules specified above, when using IDO and RO. The techniques described herein are compliant with the IDO and RO passing rules.

Although the rules presented above are fairly straight forward, implementation of the necessary control logic to follow the rules can be fairly complex due to the fact that there are multiple classes of packets, with multiple source identifiers, with ordering requirements spanning the packet class, source identifier, and arrival order.

The techniques described herein overcome the problem of implementing the control logic to allow for packet passing by providing a self organizing heap solution that has a low degree of complexity, resulting in easier implementation. In operation, the heap may comprise a plurality of elements, with each element either being empty or associated with a packet. For purposes of description, the elements may be thought of as arranged from left to right. When a new packet arrives, all existing elements may be shifted one position to the right, and the resulting empty element may be associated with the newly arrived packet. In other words, new packets are added at the left end of the heap.

Each element may contain a state which identifies the particular state that the element is in at that point in time. Each element may also contain a source ID which identifies the source of the associated packet. Each element may also contain a memory index value. The memory index, or simply index, is a value used to find the stored packet in memory, for later retrieval. For example, the index may be a memory address. Between each pair of elements may be a comparator module to compare the source ID of neighboring elements to determine if they are the same. Finally, each element may contain a state machine that takes as inputs the element's current state, the state of the element's right hand and left hand neighbors, and the results of the comparator modules to its right and left. Upon each clock cycle, the state machine may evaluate these inputs and alter the state of the element if the state machine so indicates. The state machine may also, based on the inputs mentioned above, determine if the element and its right hand or left hand neighbor should swap positions. Swapping positions essentially means that one element is passing another element, which in turn means that the associated packets are passing each other.

Swapping of adjacent entries is accomplished by the simultaneous actions of having the right-hand neighbor replicate the state and stored source ID and memory index of the left-hand neighbor, and vice versa. The neighbors must be in agreement when and whether to do this. If one neighbor were to attempt this in isolation, the effect would be to replicate one element and discard another.

To guarantee that the neighbors participating in a swap are in agreement, each element looks at its right hand neighbor and right hand ID comparator if its current state is one where it is a candidate to pass. Similarly each element looks at its left hand neighbor and left hand ID comparator if its current state is one where it is a candidate to be passed. Both neighbors have access to identical information about each other's states and about their ID comparison, and can thus they make consistent decisions about whether or not to perform a swap. All states define their elements as candidates to pass, candidates to be passed, or neither. No state defines its element as a candidate for both passing and being passed.

Furthermore, certain states may indicate that a packet is at the head of its particular message class, and is thus eligible for de-queuing. The state machine ensures that no packet is changed to a state that is eligible for de-queuing if doing so would cause any of the specified passing rules to be violated. Further description of the techniques for achieving these results is provided below and in conjunction with the attached drawings.

FIG. 1 depicts a high level example of a device. The device 100 depicted in FIG. 1 may be a type of device that may utilize the techniques described herein. The device 100 may contain a memory module 140 coupled to a self organizing heap module 150. The self organizing heap module may contain a plurality of elements 155-1 . . . n. Due to the processing speed requirements needed in today's computing environment, the device may generally be implemented as an application specific integrated circuit (ASIC) or may be included as part of a larger device, such as a processor. The device may contain memory, general purpose processors, and dedicated control logic. The various modules that are described may be implemented using any combination of the memory, processors, and logic as needed.

The device 100 may receive packets over a fabric 135, such as a PCI fabric, from any number of sources. For example, shown in FIG. 1 are three sources 110, 120, and 130. A source may be any device that accesses the fabric. For example, a device may be a peripheral card in a computer such as a RAID controller. Each source may include one or more source identifiers. A source identifier may be used to identify the source of a particular packet that is placed on the fabric. For example, as shown source 110 includes a source identifier labeled A. All packets placed on the fabric by source 110 will include the identifier A. Likewise, source identifier 120 includes a source identifier labeled B.

A single source may also place packets on the fabric with more than one source identifier. For example, in the PCI-Express specification, each function provided by a device may contain its own source identifier. So, a device attached to the fabric that provides more than one function may include more than one source identifier. Furthermore, some devices may act as aggregators of packets from other devices and forward those packets on. In the PCI-Express architecture, there may be a single destination referred to as the root complex which is the destination for all packets sent from sources. Packets headed toward the root complex may be said to be going in the upstream direction 160. A device, such as a bridge, may serve to aggregate packets from other devices and forward them toward the root complex. Thus, a device such as a bridge may receive packets, each containing a source identifier, from multiple sources, and forward those packets on toward the root complex. Although the techniques described herein are applicable to packets headed in the upstream (toward the root complex) direction and the downstream (headed away from the root complex) direction, the benefits are more readily apparent in the upstream direction. Thus, the remainder of this disclosure will be described in terms of packets headed in the upstream direction. However, it should be understood that the same techniques may also be used for packets headed in the downstream direction.

Source 130 is an example of a source that includes multiple source identifiers. Source 130 may be a device that provides multiple functions or it may be a device, such as a bridge, that aggregates packets from other devices. Device 100 itself may be a device such as a root complex, in which case it is the destination for all upstream packets on the fabric. Device 100 may also be an aggregation device, collecting packets from other devices and forwarding them on toward the root complex. The techniques described herein are applicable regardless of if the device 100 is the final destination of the packets.

The device 100 may receive packets from the various sources. These packets may be stored in the memory module 140. The memory module may include any suitable type of memory, such as SRAM, DRAM, FLASH, or any other type of memory capable of storing a packet. In addition, the self organizing heap module may allocate an element 155 for each received packet. An element will be described in further detail with respect to FIG. 2. The elements 155-1 . . . n may be thought of as an array organized from left to right. New items are inserted at the left end of the array.

In operation, a packet may be received from one of the sources 110, 120, 130. The device 100 may store the packet in the memory module 140. In addition, self organizing heap module 150 may allocate an element from the left end of the array of elements to be associated with the newly arrived packet. Allocating the element at the left side of the array may require all existing elements to be shifted by one element to the right, to make space for the new packet. The self organizing heap module may reorder the elements to allow for passing of packets. The self organizing heap module 150 and reordering of the packets is described in further detail below.

Figure 2:
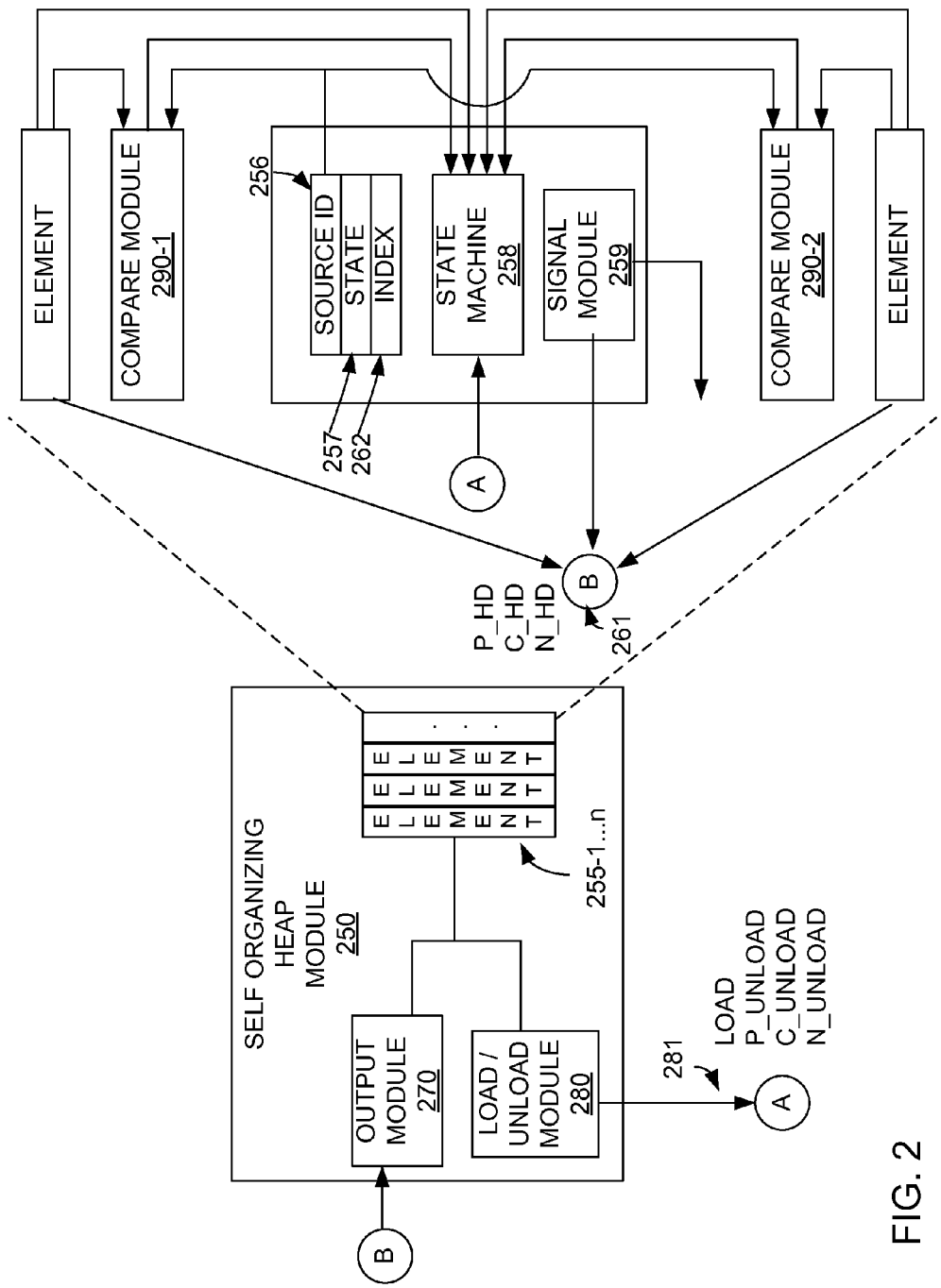
FIG. 2 depicts an example of a self organizing heap.

FIG. 2 depicts an example of a self organizing heap. The self organizing heap 250 may include elements 255-1 . . . n, output module 270, and load/unload module 280. Each element may include a source ID 256, a state 257, a index 262, a state machine 258, and a signal module 259. Disposed between each pair of elements may be a compare module 290.

The source ID 256 may include the source ID of the packet that is associated with a particular element. The state 257 may include the current state of the element. The index 262 may include the location in memory where the packet associated with the element is stored. The signal module 259 may include an output 261 that is asserted if the state of the element indicates that it is at the head of its message class. The compare modules 290-1,2 may include inputs to receive the source ID of the two elements that are connected to the compare module. The output of the compare module may be a signal indicating if the two source IDs match. The load/unload module 280 may include a signal 281 that indicates if a packet load/unload operation in process.

In operation, the state machine 258 takes as inputs the state of the element, the state of its immediate left and right neighboring elements, the result of the compare modules 290-1,2 comparing it with its immediate left and right neighboring elements, and the load/unload signal. If the load/unload signal has been asserted by the load/unload module 280, this indicates that only state changes associated with shift operations supporting the load and/or unload are enabled. All other state changes may be inhibited. As such, the state machine takes no action on the element aside from actions related to shifting. If the load/unload signal has not been asserted, the state machine examines the inputs to determine if a different state change for the element is required. One example of such a state change is to participate in a state swap with the element immediately adjacent to the element on the left or right hand side. This adjacent element may also be referred to as the left or right neighbor element. Operation of the state machine is described in further detail with respect to FIG. 3.

The signal module 259 monitors the state of the element. If the state of the element indicates that it is at the head of its message class, a head signal 261 is asserted. In one example implementation, the head signal takes the form of a set of per-ordering-class signals driven to the value of the element's memory index by the elements containing each ordering class's head, and driven to an all-ones value by all other elements. For example, an element may contain the head of the posted ordering class. That element may assert the binary value of its memory index on a set of posted class head signal lines for the element. All other elements, which by definition cannot be the posted class head, may assert all ones on their own posted class head single lines.

The posted class head signal lines from all elements may be bitwise-AND'ed across all elements. Reference B in FIG. 2 is shown as including head signals from the three elements depicted. However, it should be understood that all elements provide the head signals to the AND operation. Thus, the resulting value after the AND operation would be the memory index of the packet that is the posted class head. This memory index may be coupled to the output module 270 and load/unload module 280. The same mechanism may be provided for the non-posted and completion ordering classes.

When the output module desires to send a packet of a particular class upstream it may examine the signals 261 to determine whether any packets are eligible to be sent in that ordering class, which simultaneously determines the memory index to read the packet contents from memory. The output module may then retrieve the packet associated with the identified element using the index and send the packet upstream.

If no head packet currently exists in the heap for that ordering class, all elements drive all-ones on that ordering class's head signal 261, and the resulting all-ones pattern from the AND gate is interpreted by 270 and 280 accordingly. To avoid ambiguity, the memory index value encodings should be assigned in such a way that an all-ones value is reserved for this purpose. If an entry does contain a head for an ordering class, its memory index value propagates through the AND gates, and is visible to 270 and 280. Since head states are unique per ordering class, AND gates are a faster and simpler alternative to a full multiplexer.

As was mentioned above, new packets are added to the left end of the array of elements and this requires shifting of the elements to the right. Likewise, when a packet is output, it may be output from somewhere in the middle of the array of elements. To avoid creating a gap in the array of elements, elements to the right of the unloaded element shift left during the unload operation. Whenever new packets are loaded or packets are unloaded, the load/unload module may assert a load and/or unload signal 281. The unload signal may indicate the type of packet that is being unloaded. Simultaneous loads and unloads are also possible.

When doing both load and unload operations simultaneously, elements to the left of the unload point shift right to make room for the new entry, while those to the right of the unload point do not shift. In one example implementation, when the load or unload signals are asserted, the state machines are inhibited from simultaneously performing any swaps or other non-shift-related state transitions. In this case, the state machines' sole responsibility during a load and/or unload is to perform shift operations required to create space for a new element or to prevent gaps from being created by the unloading of an element.

FIGS. 3(a-c) depict an example of state transitions. As mentioned above, each element includes a state machine. The state transitions shown in FIGS. 3(a-c), in conjunction with the state transition Table 1 below, describe the operation of an example implementation of the state machine. Before proceeding with the description of the state transitions and the state transition table, it may be useful to first introduce the nomenclature that will be used as well as all possible states along with a brief description of the state.

As mentioned above, P, C, and N are used to denote posted, completion, and non-posted packets respectively. The suffix _FIX indicates a packet that does not attempt to pass other packets. The suffix _RO indicates a packet that will try to pass other packets under relaxed ordering rules. The suffix_IDO indicates packets that will try to pass other packets under identity based ordering rules. The suffix _ST indicates packets that are not eligible to pass other packets under either relaxed ordering or identity based ordering rules.

Suffix _ST and _FIX are also used to represent packets that were formerly represented by _RO and _IDO, but have ceased to be eligible to pass other packets because they have encountered a packet that is impassable under the relevant RO or IDO rules. If the inability to pass was the result of a source ID match, a _FIX state results. A _ST state results if the inability to pass was the result of a rule not dependent upon a source ID test, for example if passing was prevented by an unconditional prohibition such as passing of a completion by another completion.

The foregoing convention regarding the choice of _ST versus_FIX to represent packets no longer eligible to pass other packets, allows for an optimization whereby N_IDO elements may treat an N_FIX element containing a matching source ID value as an impassable barrier, even though the IDO rules would permit unconditional passing in this case. In this case, passing is prohibited not because it is illegal, but because it is not beneficial to performance. Since N_FIX elements represent non-posted packets that are known to already be encumbered by the next posted packet to their right, and have the same source ID as the encumbering posted packet, no performance benefit could result from allowing further N_IDO packets with the same source ID to in turn pass them. If such passing were permitted, it would unnecessarily reorder non-posted packets amongst themselves, even though they are all known to all be encumbered by the posted packet. This inhibition of passing is reflected in state transition 2-17a in Table 2.

The suffix _UE* is used with C and N packets to indicate the packet is known to not be encumbered by any P packets. The * is either a zero or a one. A zero indicates that no packets of the opposite type are to the right of the packet. For example, a packet that is C_UE0 indicates that no N packets are to its right. Likewise, a packet that is N_UE0 indicates that no C packets are to its right. A one indicates that at least one packet of the opposite type may exist to the right of the packet. For example, a C_UE1 indicates that at least one N packet is to the right. A N_UE1 indicates that at least one C packet may exist to the right.

The suffix _HD* indicates the packet is at the head of its ordering class. In the case of P packets, there is no numeral. In the case of N and C packets, the numeral indicates if at least one of the opposite type of packet may exist to the right. The suffixes _FIX, _ST, and P_HD states represent packets that can be passed by _RO and_IDO packets when the passing rules permit. _UE and _HD* (other than P_HD) represent packets that can neither pass nor pass others, as they have already passed all encumbering packets in the heap.

P_FIX_this state signifies a posted packet. As described above, posted packets do not pass other packets within the heap. As such, packets in this state do not attempt to pass other packets. Other packets may pass packets in this state according to the rules described above. All newly received posted packets begin in this state.

One purpose of the self-ordering heap is to promote legal passing of posted packets by non-posted and completion packets wherever possible, to improve performance. It should be noted that the inverse—passing of non-posted and completion packets by posted packets—is always legal and is required to avoid deadlock. Because passing by posted packets is always legal, the heap always identifies a posted head packet whenever at least one posted packet exists in the heap. There may be delays in identifying the head posted packet due to the ripple-propagation involved in its discovery, but it will be unconditionally identified. Thus, while passing by non-posted or completion packets occurs within the heap, passing by posted packets can be achieved whenever necessary by unload order.

P_HD—this state signifies a posted packet that is the next posted packet that is eligible for de-queuing (i.e. the head posted packet). When the output module observes a valid memory reference value on the P_HD signals from the AND gates, it knows that a valid posted packet exists in the heap, and it is in already possession of the memory index to retrieve the corresponding packet from memory. When the load/unload module asserts the P_UNLOAD signal (280) and does not assert the LOAD signal, all elements to the right of the one in P_HD state, shift one place to the left. When both the P_UNLOAD and LOAD single are asserted, all elements to the left of the one in the P_HD state shift one place to the right. There is at most one P_HD packet at a time. P_HD packets do not attempt to pass other packets. Other packets may pass packets in this state according to the rules described above. The act of passing P_HD guarantees that a non-posted or completion packet is unencumbered by posted packets. As such, state transitions for passing of P_HD may thus be optimized to incorporate a simultaneous transition to an unencumbered state. This is illustrated in state transitions 2-4b, 2-9b, and 2-19b, described in Table 2 below.

C_ST—this state signifies a completion packet that is not an IDO or RO packet, and thus remains strictly ordered. Packets in this state do not attempt to pass other packets. Other packets may pass packets in this state according to the rules described above. All newly received completion packets that are not IDO or RO packets begin in this state. This state is also used to signify a completion packet that is unable to pass any other packets because it is encumbered by another completion packet.

N_ST—this state this state signifies a non-posted packet that is not an IDO packet, and thus remains strictly ordered. Packets in this state do not attempt to pass other packets. Other packets may pass packets in this state according to the rules described above. All newly received non-posted packets that are not IDO packets begin in this state.

C_FIX—this state signifies an IDO completion packet that is no longer eligible to pass other packets due to a source ID match. For example, the packet may have been encumbered by another packet which it was ineligible to pass under the applicable IDO rules. Other packets may pass packets in this state according to the rules described above.

N_FIX—this state signifies a non-posted packet that is no longer eligible to pass other packets. For example, the packet may have been encumbered by another packet which it was ineligible to pass under the applicable IDO rules. Other packets may pass packets in this state according to the rules described above.

C_RO—this state signifies a completion packet that is an RO packet. Packets in this state are free to pass other packets, subject to the rules described above. Other packets may not pass packets in this state. All newly received completion packets that are RO packets begin in this state.

C_IDO—this state signifies a completion packet that is an IDO packet. Packets in this state are free to pass other packets, subject to the rules described above. Other packets may not pass packets in this state. All newly received completion packets that are IDO packets begin in this state.

N_IDO—this state signifies a non-posted packet that is an IDO packet. Packets in this state are free to pass other packets, subject to the rules described above. Other packets may not pass packets in this state. All newly received non-posted packets that are IDO packets begin in this state.

C_HD0/C_HD1—these states signify a completion packet that is the next completion packet that is eligible for de-queuing (i.e. the head completion packet). When the output module observes a valid memory reference value on the C_HD signals from the AND gates, it knows that a valid completion packet exists in the heap, and it is in already possession of the memory index to retrieve the corresponding packet from memory. When the load/unload module asserts the C_UNLOAD signal (280) and does not assert the LOAD signal, all elements to the right of the one in C_HD* state shift one place to the left. When both the C_UNLOAD and LOAD single are asserted, all elements to the left of the one in the C_HD* state shift one place to the right. The difference between the two states is that the C_HD0 state signifies that no non-posted packets lie to the right of the packet, while the C_HD1 state indicates that at least one non-posted packet lies to the right of the packet. At any given time, there will be no C_HD0 or C_HD1 packets, one C_HD0 packet, or one C_HD1 packet. A packet in one of these states does not attempt to pass other packets nor do other packets attempt to pass a packet in one of these states.

N_HD0/N_HD1—these states signify a non-posted packet that is the next non-posted packet that is eligible for de-queuing (i.e. the head non-posted packet). When the output module observes a valid memory reference value on the N_HD signals from the AND gates, it knows that a valid completion packet exists in the heap, and it is in already possession of the memory index to retrieve the corresponding packet from memory. When the load/unload module asserts the N_UNLOAD signal (280) and does not assert the LOAD signal, all elements to the right of the one in N_HD* state, shift one place to the left. When both the N_UNLOAD and LOAD single are asserted, all elements to the left of the one in the N_HD* state shift one place to the right. The difference between the two states is that the N_HD0 state signifies that no completion packets lie to the right of the packet, while the N_HD1 state indicates that at least one completion packet lies to the right of the packet. At any given time, there will be no N_HD0 or N_HD1 packets, one N_HD0 packet, or one N_HD1 packet. A packet in one of these states does not attempt to pass other packets nor do other packets attempt to pass a packet in one of these states.

C_UE0—this state signifies a completion packet that is not encumbered by any other packets and that only other completion packets lie between it and the C_HD0 packet. Packets in this state do not attempt to pass other packets nor do other packets attempt to pass packets in this state.

C_UE1—this state signifies a completion packet that is not encumbered by any other packets and that at least one non-posted packet lies to the right of this packet. Packets in this state do not attempt to pass other packets nor do other packets attempt to pass packets in this state.

N_UE0—this state signifies a non-posted packet that is not encumbered by any other packets and that only other non-posted packets lie between it and the N_HD0 packet. Packets in this state do not attempt to pass other packets nor do other packets attempt to pass packets in this state.

N_UE1—this state signifies a non-posted packet that is not encumbered by any other packets and that at least one completion packet lies to the right of this packet. Packets in this state do not attempt to pass other packets nor do other packets attempt to pass packets in this state.

State transitions serve several purposes. Some transitions represent copying state from a left-hand neighboring element, for the purposes of shifting a portion of the heap to make room for insertion of a new element on the left. Some represent copying of state from a right-hand neighboring element, for the purposes of swapping the content of two adjacent elements. Both of the forgoing are accompanied by simultaneous copying of other non-state information, such as source identification and memory index values.

Other transitions represent a changing from a state eligible to passing under IDO or RO rules to one ineligible for passing, once a packet has done all the passing it can do under the relevant rules. This allows other, less constrained packets in turn to pass it in the future.

Still other state transitions represent detection of a packet's location relative to packets to the right of it. For example, a packet may discover that it is the head of its ordering class, or that it is within the rightmost contiguous ordering class within the heap. State transitions that represent detection of location always depend upon looking at the state of right-hand neighbor states, and as such, knowledge about location can be said to ripple-propagate from right to left.

TABLE 1

| Transition ID | Initial state | LOAD | UNLOAD | Action |
|---|---|---|---|---|
| 1-1 | P_FIX, P_HD, N_FIX, N_IDO, N_ST, C_FIX, C_IDO, C_RO, C_ST, C_UE1, N_UE1, C_UE0, N_UE0, C_HD1, C_HD0, N_HD1, N_HD0, Empty | YES | NONE | Load from left neighbor |
| 1-2 | N_HD0, N_HD1, C_HD0, C_UE0 | NO | N_UNLOAD | Load from right neighbor |
| 1-3 | C_HD0, C_HD1, N_HD0, N_UE0 | NO | C_UNLOAD | Load from right neighbor |
| 1-4 | C_HD0, C_HD1, N_HD0, N_HD1, C_UE0, C_EU1, N_UE0, N_UE1, P_HD | NO | P_UNLOAD | Load from right neighbor |
| 1-5 | P_FIX, P_HD, N_FIX, N_IDO, N_ST, C_FIX, C_IDO, C_RO, C_ST | YES | P_UNLOAD | Load from left neighbor |
| 1-6 | P_FIX, P_HD, N_FIX, N_IDO, N_ST, C_FIX, C_IDO, C_RO, C_ST, N_UE1, C_UE1, N_HD1, N_HD0, N_UE0 | YES | N_UNLOAD | Load from left neighbor |
| 1-7 | P_FIX, P_HD, | YES | C_UNLOAD | Load from |

TABLE 1-continued

| Transition ID | Initial state | LOAD | UNLOAD | Action |
|---|---|---|---|---|
| | N_FIX, N_IDO, N_ST, C_FIX, C_IDO, C_RO, C_ST, C_UE1, N_UE1, C_HD1, C_HD0, C_UE0 | | | left neighbor |

Table 1 shows a partial state transition table showing only those state transitions related to shifting operations, supporting loading and unloading operations. The first column of the table is a transition number. This number is used to reference the depiction of the state transition within FIGS. 3(a-h), as will be described below. The second column identifies the initial state of the state machine of an element. The third and fourth columns specify the values of the signals 281. Load indicates if a packet is being loaded. (P,C,N) unload indicates if a packet is being unloaded. Although packets may be loaded and unloaded at the same time, only one packet may be unloaded at any given time. The final column describes the action taken, which is to copy the state of either the left or right neighboring element. In addition to the state, the source ID and memory index is also copied. The copy operations combine to form a left- or right-shift operation of an appropriate portion of the heap.

TABLE 2

| Transition ID | Initial state | Neighbor to consider | Neighbor state | Neighbor ID match? | Load ID and index from neighbor? | Next State |
|---|---|---|---|---|---|---|
| 2-1a | C_IDO | Right | N_ST | X | Yes | N_ST |
| 2-1b | N_ST | Left | C_IDO | X | Yes | C_IDO |
| 2-2a | C_IDO | Right | N_FIX | X | Yes | N_FIX |
| 2-2b | N_FIX | Left | C_IDO | X | Yes | C_IDO |
| 2-3a | C_IDO | Right | P_FIX | N | Yes | P_FIX |
| 2-3b | P_FIX | Left | C_IDO | N | Yes | C_IDO |
| 2-4a | C_IDO | Right | P_HD | N | Yes | P_HD |
| 2-4b | P_HD | Left | C_IDO | N | Yes | C_UE1 |
| 2-5a | C_IDO | Right | P_FIX | Y | No | C_FIX |
| 2-6a | C_IDO | Right | P_HD | Y | No | C_FIX |
| 2-7a | C_RO | Right | P_FIX | X | Yes | P_FIX |
| 2-7b | P_FIX | Left | C_RO | X | Yes | C_RO |
| 2-8a | C_RO | Right | P_FIX | X | Yes | P_FIX |
| 2-8b | P_FIX | Left | C_RO | X | Yes | C_RO |
| 2-9a | C_RO | Right | P_HD | X | Yes | P_HD |
| 2-9b | P_HD | Left | C_RO | X | Yes | C_RO |
| 2-10a | C_RO | Right | N_ST | X | Yes | N_ST |
| 2-10b | N_ST | Left | C_RO | X | Yes | C_RO |
| 2-11a | C_RO | Right | N_FIX | X | Yes | N_FIX |
| 2-11b | N_FIX | Left | C_RO | X | Yes | C_RO |
| 2-12a | C_IDO | Right | C_ST | X | Yes | C_ST |
| 2-12b | C_ST | Left | N_IDO | X | Yes | N_IDO |
| 2-13a | N_IDO | Right | C_FIX | X | Yes | C_FIX |
| 2-13b | C_FIX | Left | N_IDO | X | Yes | N_IDO |
| 2-14a | N_IDO | Right | N_ST | X | Yes | N_ST |
| 2-14b | N_ST | Left | N_IDO | X | Yes | N_IDO |
| 2-15a | N_IDO | Right | N_FIX | N | Yes | N_FIX |
| 2-15b | N_FIX | Left | N_IDO | N | Yes | N_IDO |
| 2-17a | N_IDO | Right | N_FIX | Y | No | N_FIX |
| 2-18a | N_IDO | Right | P_FIX | N | Yes | P_FIX |
| 2-18b | P_FIX | Left | N_IDO | N | Yes | N_IDO |
| 2-19a | N_IDO | Right | P_HD | N | Yes | P_HD |
| 2-19b | P_HD | Left | N_IDO | N | Yes | N_UE1 |
| 2-20a | N_IDO | Right | P_FIX | Y | No | N_FIX |
| 2-21a | N_IDO | Right | P_HD | Y | No | N_FIX |
| 2-22a | C_RO | Right | C_ST | X | No | C_ST |
| 2-23a | C_RO | Right | C_FIX | X | No | C_ST |
| 2-24a | C_IDO | Right | C_ST | X | No | C_ST |
| 2-25a | C_IDO | Right | C_FIX | X | No | C_ST |

Table 2 shows a partial state transition table, showing only those state transitions related to attempts at passing, successful or otherwise. The first column of the table is a transition number. This number is used to reference the depiction of the state transition within FIGS. 3(a-h), as will be described below. The second column identifies the initial state of the state machine. The third column specifies a neighboring element, whose source ID and state are taken into consideration in determining the state transition. The fourth column identifies the state found in the specified neighboring element. The fifth column identifies the value of the source ID comparison with the specified neighboring element. An X in the fifth column indicates a don't care condition, while a Y or N indicates match or no match, respectively. The sixth column identifies whether or not to load source ID and memory index values from the specified neighboring element. The final column describes the new state to be transitioned to.

TABLE 3

| Transition ID | Right Neighbor | Final state, based on initial state family | | |
|---|---|---|---|---|
| | | P_<any> | C_<any> | N_<any> |
| 3-1 | N_UE1 | P_HD | C_UE1 | N_UE1 |
| 3-2 | C_UE1 | P_HD | C_UE1 | N_UE1 |
| 3-3 | N_HD1 | P_HD | C_UE1 | N_UE1 |
| 3-4 | C_HD1 | P_HD | C_UE1 | N_UE1 |
| 3-5 | N_UE0 | P_HD | C_HD1 | N_UE0 |
| 3-6 | C_UE0 | P_HD | C_UE0 | N_HD1 |
| 3-7 | N_HD0 | P_HD | C_HD1 | N_UE0 |
| 3-8 | C_HD0 | P_HD | C_UE0 | N_HD1 |
| 3-9 | Empty | P_HD | C_HD0 | N_HD0 |

Table 3 shows a partial state transition table, showing only those state transitions related to detection of ordering class heads. The first column identifies the state contained in the element's right-hand neighbor. The second column specifies the state to which the element will transition, if it is currently in any P_ state. The third column specifies the state to which the element will transition, if it is currently in any C_ state. The fourth column specifies the state to which the element will transition, if it is currently in any N_ state.

Although it is possible to combine the effects of state transitions defined in these tables in other ways, one example implementation can be achieved by inhibiting transitions defined in subsequent tables if any transitions defined in an earlier table are taken. So, while a transition defined in Table 1 occurs for an element due to a load or unload operation, transitions defined in Tables 2 and 3 may be inhibited for that element. Likewise, while a transition defined in Table 2 occurs for an element due to an attempted passing operation, transitions defined in Tables 3 may be inhibited for that element.

If a particular combination of current state, neighbor state, and source ID match is not shown in Table 2, this indicates that no action is to be taken as a result of this table. The state machine does not copy source ID or memory index values from its neighboring element, and Table 3 determines whether any state transition occurs.

In one example implementation, the state transitions in any one table are applicable only if no state transitions from an earlier table are taken. However, many optimizations are possible to increase performance by combining primitive transitions from multiple tables into more complex transitions. For example, by combining transitions 1-1 and 3-9 into an expanded and more complex set of transitions, a newly loaded posted packet my enter a previously-empty heap directly as a P_HD element state, without first passing through the P_FIX state. By way of another example, by combining transitions 2-9b and 3-5, a completion packet may pass the head posted packet and become the head completion packet in a single operation, in cases where the P_HD element was immediately to the left of an N_HD0. A third example would be to apply transitions from Tables 2 and 3 even during load or unload operations, by applying them only to those elements not involved in the shift operation as defined in Table 1. Instead of inhibiting all Table 2 and Table 3 transitions completely during load and unload operations, they would in effect only be inhibited if they conflict with shift operations.

Such optimizations may in some cases improve heap performance by more quickly discovering passing opportunities or more quickly identifying ordering class head packets. In general, such combined transitions have the same outcome in a single clock cycle that would otherwise take multiple consecutive clock cycles to achieve. Some such optimizations may be undesirable because of implementation complexity—for example some combinations would create dependencies in the state machine of one element upon the current state of non-adjacent elements.

Each state transition in Tables 1-3 are identified with a state transition number. The state transitions in FIGS. 3(a-h) are labeled with the corresponding numbers. In order to better understand the state transitions, a brief example is presented. In this example, only twelve elements 301-312 are shown. However, this is for purposes of ease of description. The techniques described herein are applicable to any number of elements. A small sample of possible state transitions is shown in FIGS. 3(a-h) to explain how the state transition tables are used and is not intended to be exhaustive.

FIGS. 3(a-h) are an example of the operation of the self organizing heap. In FIG. 3(a), an array of elements (301-312)-a are shown. Each element includes its current state as well as its source ID. For purposes of this description, assume the elements are associated with packets as depicted. A new packet shown as C_RO, source A may arrive. This may cause the LOAD signal to be asserted. As explained above, during load/unload operations, only the state transitions shown in Table 1 are allowed. For each element, the state machine operates according to Table 1. In this case, Table 1 shows that when the LOAD signal is asserted without a corresponding unload, all elements execute state transition 1-1. In this transition, each element is loaded with the contents (i.e. state, source ID, index) of its left hand neighbor. As shown, element 311-a will load the contents of element 310-a. Element 310-a will load the contents of element 309-a. Each element will execute this behavior. Element 301-a has no left hand neighbor. As such, element 301-a will load itself with the newly arrived packet. In essence, each element has shifted one to the left in order to create space for the newly arrived packet.

Figure 3A:
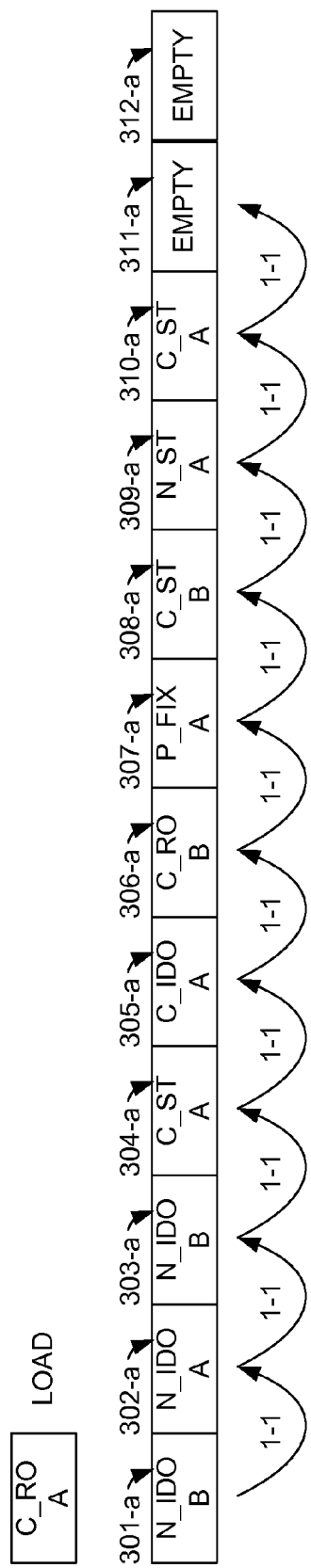
FIGS. 3(a-h) depict an example of state transitions.
Figure 3B:
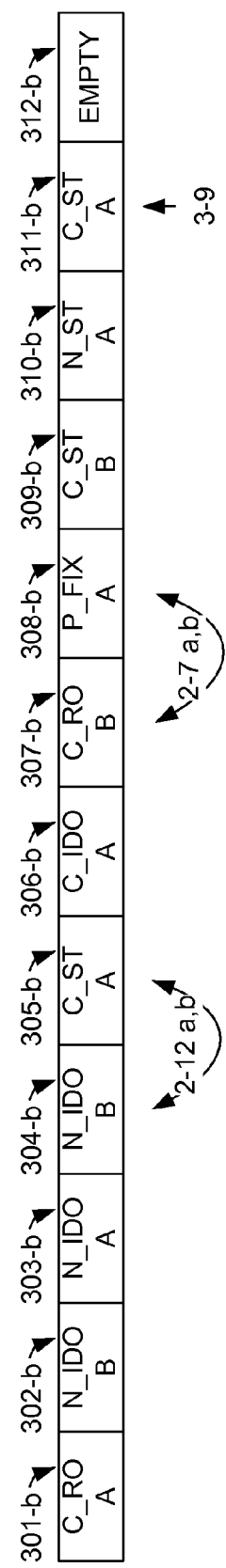
Figure 3G:
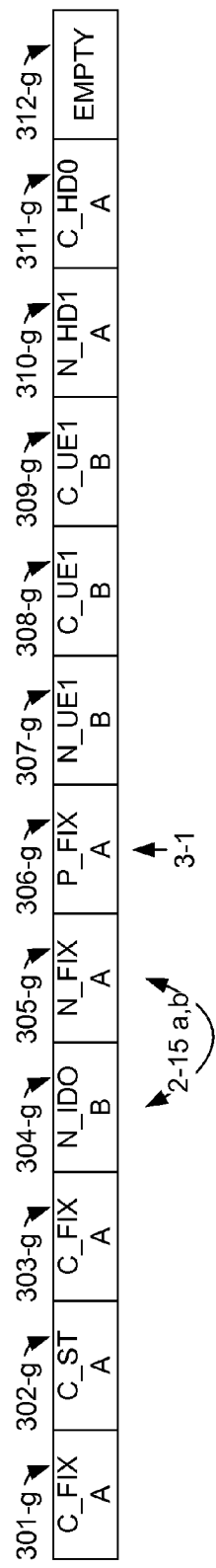
Figure 3H:
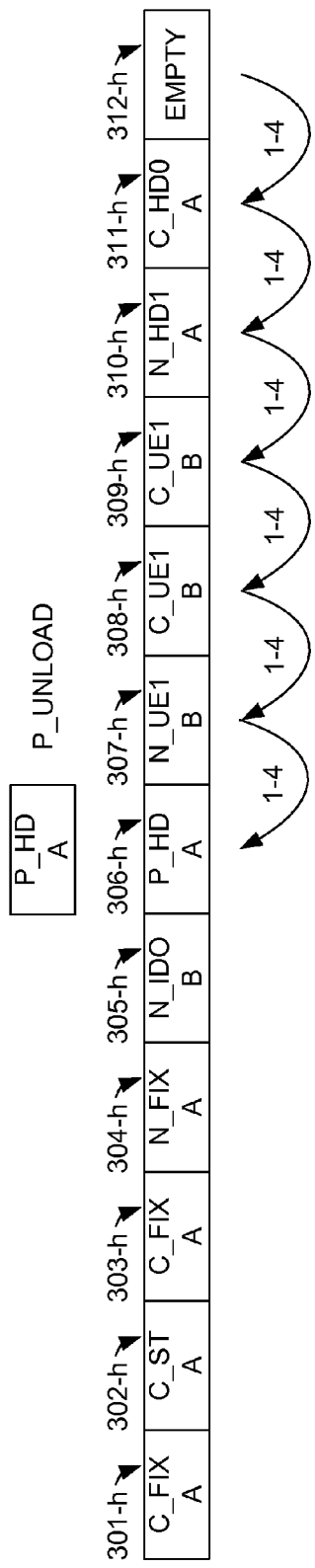

FIG. 3(b) depicts the states of the elements in the clock cycle following FIG. 3(a). As shown, the newly arrived packet is now contained in element 301-b. In FIG. 3(b), there is no packet being loaded or unloaded. As such, none of the state transitions in Table 1 apply. For each element, it is attempted to locate an entry in Table 2 that corresponds to the element and its immediate neighbors. For example, element 301-b is a C_RO packet from source A. From Table 2, it is shown that C_RO packets look to their right hand neighbor to determine if a state transition is necessary. In this case, the right hand neighbor is packet 302-b, which is a N_IDO packet from source B. There is no entry in table one for a C_RO packet that has a right hand neighbor that is N_IDO. As such, no transition based on Table 2 is performed. In this example, the same holds true for packets 302-b and 303-b. Based on Table 3, no transitions are needed for any of elements 301-303-b. Transitions based on Table 3 are described in further detail below.

Element 304-b is more interesting. As shown, element 304-b is an N-IDO packet. From Table 2, transition 2-12a, an N_IDO packet looks to its right hand neighbor, and if the right hand neighbor is a C_ST packet, regardless of if the source IDs match, the element loads itself with the contents of its right hand neighbor, and transitions to state C_ST. Likewise, for element 305-b, Table 1 entry 2-12b indicates that a C_ST packet looks to its left hand neighbor, and if the left hand neighbor is a N-IDO packet, regardless of if the source IDs match, the element loads itself with the contents of its left hand neighbor. In essence, elements 304 and 305-b swap positions, which is equivalent to the packet associated with element 304-b passing the packet associated with element 305-b.

The process described above occurs for each element. As shown, no transitions are found for element 306-b. Elements 307 and 308-b perform state transitions 2-7 a,b, which effectively swaps the contents of those two elements. No transitions are required for elements 309-b and 310-b. A somewhat more interesting case occurs with element 311-b. Element 311-b is a C_ST packet with an empty element right hand neighbor. No transition matching these parameters is found in Table 2. However, these parameters do match transition 3-9 in Table 3. As shown in Table 3, any packet which has an empty right hand neighbor should transition to the head of its ordering class. As such, the C_ST packet should transition to C_HD0, as indicated by Table 3.

FIG. 3(c) depicts the states of the elements in the clock cycle following FIG. 3(b). For the reminder of the description of FIG. 3, only elements which have a state transition will be described. Elements that are not described indicate that no state transitions are done. As shown, elements 303-c and 304-c swap positions based on transitions 2-12 a,b. Element 306-c changes state, with no swap, according to transition 2-5a. Element 308-c changes state, with no swap, according to state transition 2-22a. Element 310-c changes state according to transition 3-8.

As this process continues, what should be noticed is that the packets are reordering themselves based on their states and their neighbor element states. Packets that are able to pass other packets according to the passing rules steadily move toward the right of the array of elements. Packets that were at one time able to pass other packets, but have now become blocked, change states to prevent further attempts at passing.

FIG. 3(d) depicts the states of the elements in the clock cycle following FIG. 3(c). As is shown, several elements have changed states to indicate that they are no longer able to pass or to indicate that they are moving or at the head of their ordering class. For example, element 306-d is now a C_FIX element, indicating it will no longer attempt to pass other packets. Similarly, 308-d is now a C_ST element, and will no longer attempt to pass other packets. Element 310-d has changed state to indicate that it is the head of the non-posted class, and is eligible to be unloaded.

The same process described above occurs again. Here, elements 302 and 303-d indicate that they will swap based on transitions 2-12 a,b. Likewise, elements 305 and 306-*d* will swap based on transitions 2-13 a, b. Element 309-*d* indicates that it will change state according to transition 3-8.

FIG. 3(*e*) depicts the states of the elements in the clock cycle following FIG. 3(*d*). As shown, element 309-*e* indicates that it is now in the C_UE1 state, and is thus waiting to be elevated to the head of the completion ordering class. Just as above, state transitions are determined by using the tables. Here, elements 304 and 305-*e* swap based on transitions 2-13 a,b. Likewise, elements 306 and 307-*e* swap based on transitions 2-18 a,b. Element 308-*e* indicates that it will change states according to transition 3-2.

FIG. 3(*f*) depicts the states of the elements in the clock cycle following FIG. 3(*e*). As shown, element 308-*f* now indicates it is a C_UE1 packet, which is waiting to be elevated to the head of the completion class. State transitions are again determined using the tables. In this case, elements 303 and 304-*f* swap based on transitions 2-13 a,b. Elements 305-*f* and 307-*f* change state based on transitions 2-20a and 3-2 respectively.

FIG. 3(*g*) depicts the states of the elements in the clock cycle following FIG. 3(*f*). As shown, element 305-*g* now indicates it is a N_FIX packet, and will no longer attempt to pass other packets. Element 307-*g* now indicates it is a N_UE1 packet, which is waiting to be elevated to the head of the non-posted class. State transitions are again determined based on the transition tables. In this case, elements 304 and 305-*g* swap based on transitions 2-15 a,b, while element 306-*g* changes state based on transition 3-1.

FIG. 3(*h*) depicts the states of the elements in the clock cycle following FIG. 3(*g*). As shown, element 306-*h* now indicates it is at the head of the posted class. As explained above, the availability of the head of an ordering class will generate a head signal the output module. If the output module should decide to output a packet from a particular message class, it will first determine if there is an element that is at the head of the message class. If so, it will unload the packet associated with the element as well as assert the unload signal for the type of packet being unloaded. In the example shown in FIG. 3(*h*), assume the output module wishes to unload the head of the posted packets. As such, the P_UNLOAD signal is asserted, which notifies the state machines of all elements that only shifting operations, in accordance with Table 1 are permitted.

As shown in FIG. 3(*h*), each element is compared with Table 3 to determine if any action is required. For all of the states of elements 306 to 312-*h*, Table 1 indicates that transition 1-4 should be performed, which is essentially a shift of an element one place to the left. As such, the elements to the right of that packet are shifted to the left, avoiding the creation of a gap between valid entries within the heap.

As mentioned above, the description of FIG. 3 did not and was not intended to cover every possible state transition. Rather, it was simply an example of the operation of the state machine defined by Tables 1-3. By following the procedures outlined above, the array of elements is able to reorder itself to permit packet passing according to the packet passing rules that are implemented by the state machines. The state machines ensure that no packet will reach the head of its respective ordering class and be eligible for output would cause any of the packet passing rules to be violated.

Figure 4:
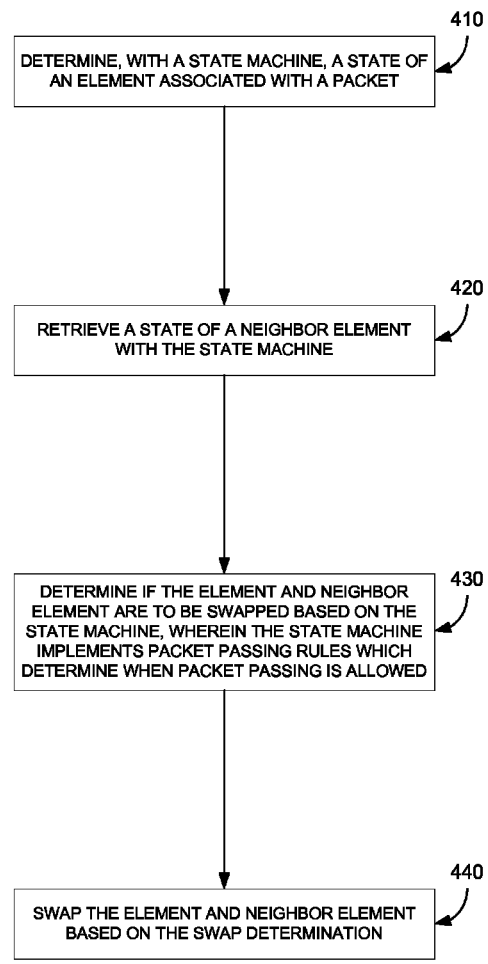
FIG. 4 is an example of a high level flow diagram depicting swapping elements.

FIG. 4 is an example of a high level flow diagram depicting swapping elements. In block 410 a state of an element associated with a packet may be determined by a state machine. In block 420 the state machine may retrieve the state of a neighbor element. In block 430 it may be determined if the element and the neighbor element are to be swapped based on the state machine, wherein the state machine implements packet passing rules which determine when packet passing is allowed. In block 440 the element and the neighbor element may be swapped based on the swap determination.

Figure 5:
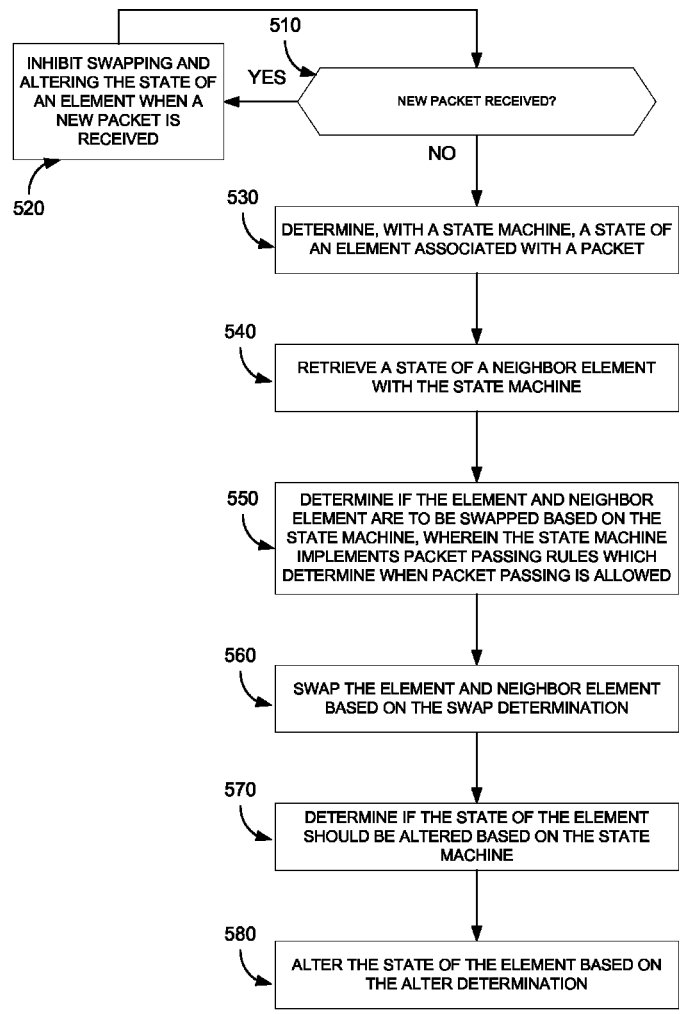
FIG. 5 is another example of a high level flow diagram depicting swapping elements.

FIG. 5 is another example of a high level flow diagram depicting swapping elements. In block 510 it may be determined if a new packet has been received. If not, the process moves to block 530, described below. Otherwise the process moves to block 520. In block 520 swapping and altering the state of an element may be inhibited when a new packet is added. As explained above, elements may need to be shifted when new packets are added, and as such swapping is not allowed during this period.

In block 530 a state of an element associated with a packet may be determined by a state machine. In block 540 a state of a neighbor element may be retrieved with the state machine. In block 550 it may be determined if the element and the neighbor element are to be swapped based on the state machine, wherein the state machine implements packet passing rules which determine when packet passing is allowed.

In block 560 the element and the neighbor element may be swapped based on the swap determination. In block 570 it may be determined if the state of the element should be altered based on the state machine. In block 580 the state of the element may be altered based on the alter determination.

Figure 6:
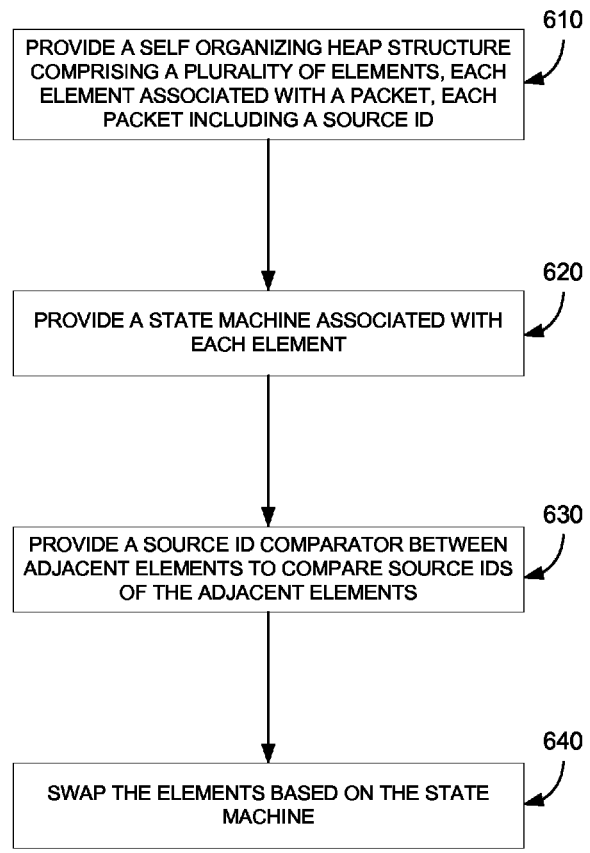
FIG. 6 is an example of a high level flow diagram for a self organizing heap.

FIG. 6 is an example of a high level flow diagram for a self organizing heap. In block 610 a self organizing heap structure comprising a plurality of elements, each element associated with a packet which includes a source ID may be provided. In block 620 a state machine associated with each element may be provided. In block 630 a source ID comparator may be provided between adjacent elements to compare the source IDs of the adjacent elements. In block 640 the elements may be swapped based on the state machine.

Figure 7:
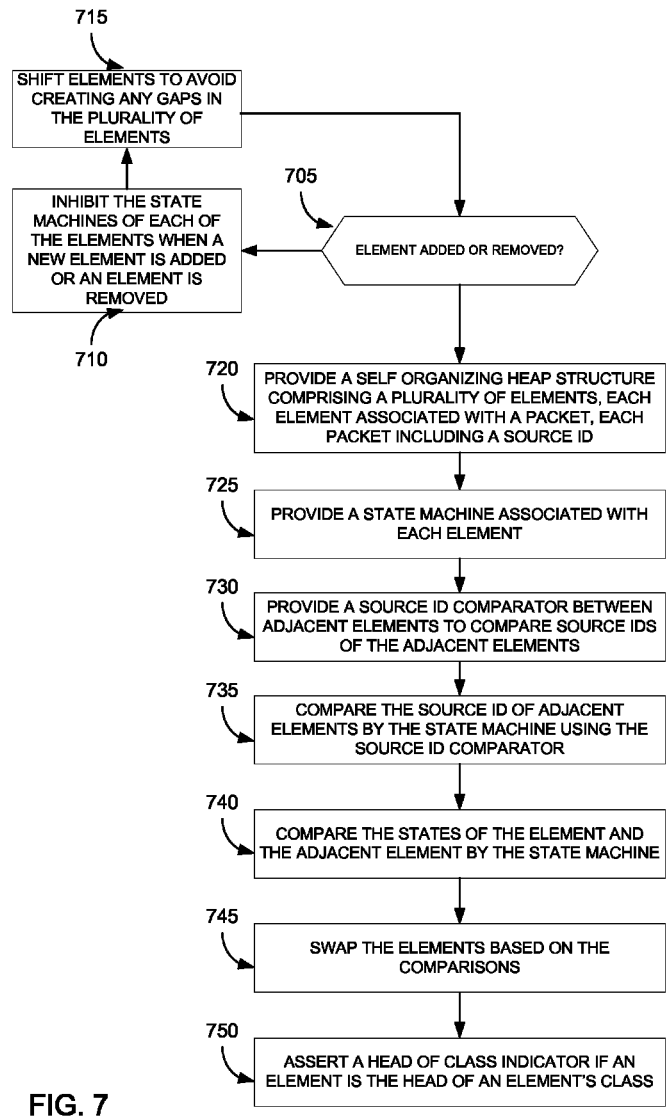
FIG. 7 is another example of a high level flow diagram for a self organizing heap.

FIG. 7 is another example of a high level flow diagram for a self organizing heap. In block 705 it may be determined if an element is being added or removed. If not, the process moves to block 720, which is described below. If so, the process moves to block 710. In block 710 the state machines of each of the elements may be inhibited while new packets are added or an element is removed. In block 715 elements may be shifted to avoid creating any gaps in the plurality of elements.

In block 720 a self organizing heap structure comprising a plurality of elements, each element associated with a packet which includes a source ID may be provided. In block 725 a state machine associated with each element may be provided. In block 730 a source ID comparator may be provided between adjacent elements to compare the source IDs of the adjacent elements. In block 735 the source IDs of the adjacent elements may be compared by the state machine using the source ID comparator.

In block 740 the states of the element and the adjacent element may be compared by the state machine. In block 745 the elements may be swapped based on the comparison. In block 750 a head of class indicator may be asserted if the element is the head of an element's class.

We claim:

1. A device comprising:
a memory module to store a plurality packets;
a self organizing heap module comprising:
a plurality of elements, wherein each element is associated with one packet of the plurality of packets, to reorder the elements based on packet passing rules, and
a load/unload input signal which, when asserted, inhibits reordering of the plurality of elements; and
a signal module comprising:

a posted head signal which is asserted if an element of the plurality of elements is at a head of a posted queue;

a non-posted head signal which is asserted if an element of the plurality of elements is at a head of a non-posted queue; and a completion head signal which is asserted if an element of the plurality of elements is at a head of a completion queue.

2. The device of claim 1 wherein each element comprises:

a state data containing a state of the associated packet;

a source ID containing a source identifier of the associated packet; and a state machine to alter the state of the element based on the state data, a neighbor state data, and the source ID.

3. The device of claim 2 wherein the self organizing heap module is a module to further:

swap the element and the neighbor element based on the state machine.

4. The device of claim 1 further comprising:

an output module to output one of a posted packet, a non-posted packet, and a completion packet, wherein the output module outputs the packet associated with the element based on the signal module.

5. The device of claim 4 further comprising:

a compare module coupled to neighboring elements to compare the source ID of the packets associated with the elements.

6. A method comprising:

determining, with a state machine, a state of an element associated with a packet;

retrieving a state of a neighbor element with the state machine;

determining if the element and neighbor element are to be swapped based on the state machine, wherein the state machine implements packet passing rules which determine when packet passing is allowed;

swapping the element and neighbor element based on the swap determination;

inhibiting swapping and altering the state of an element when a new packet is received;

asserting a posted head signal responsive to the state of the element indicating that the element is at a head of a posted queue;

asserting a non-posted head signal responsive to the state of the element indicating that the element is at a head of a non-posted queue; and asserting a completion head signal responsive to the state of the element indicating that the element is at a head of a completion queue.

7. The method of claim 6 further comprising:

determining if the state of the element should be altered based on the state machine; and altering the state of the element based on the alter determination.

8. The method of claim 7 wherein the state machine determines swapping and altering the state of an element based on a current state of the element and a state of the neighbor element.

9. A method comprising:

providing a self organizing heap structure comprising a plurality of elements, each element associated with a packet, each packet including a source ID;

providing a state machine associated with each element;

providing a source ID comparator between adjacent elements to compare source IDs of the adjacent elements;

swapping the elements based on the state machine;

inhibiting the state machines of each of the elements when a new element is added or an element is removed; and asserting a posted head signal if an element of the plurality of elements is at a head of a posted queue;

asserting a non-posted head signal if an element of the plurality of elements is at a head of a non-posted queue; and asserting a completion head signal if an element of the plurality of elements is at a head of a completion queue.

10. The method of claim 9 wherein swapping the elements further comprises:

comparing the source ID of adjacent elements by the state machine using the source ID comparator;

comparing the states of the element and the adjacent element by the state machine; and swapping the elements based on the comparisons.

11. The method of claim 10 further comprising:

asserting a head of class indicator if an element is the head of an element's class.

12. The method of claim 11 further comprising:

shifting elements to avoid creating any gaps in the plurality of elements.

* * * * *